Feb. 5, 1952 D. B. BAKER 2,584,533
PRESSURE EQUALIZING VALVE
Filed June 14, 1948 2 SHEETS—SHEET 1
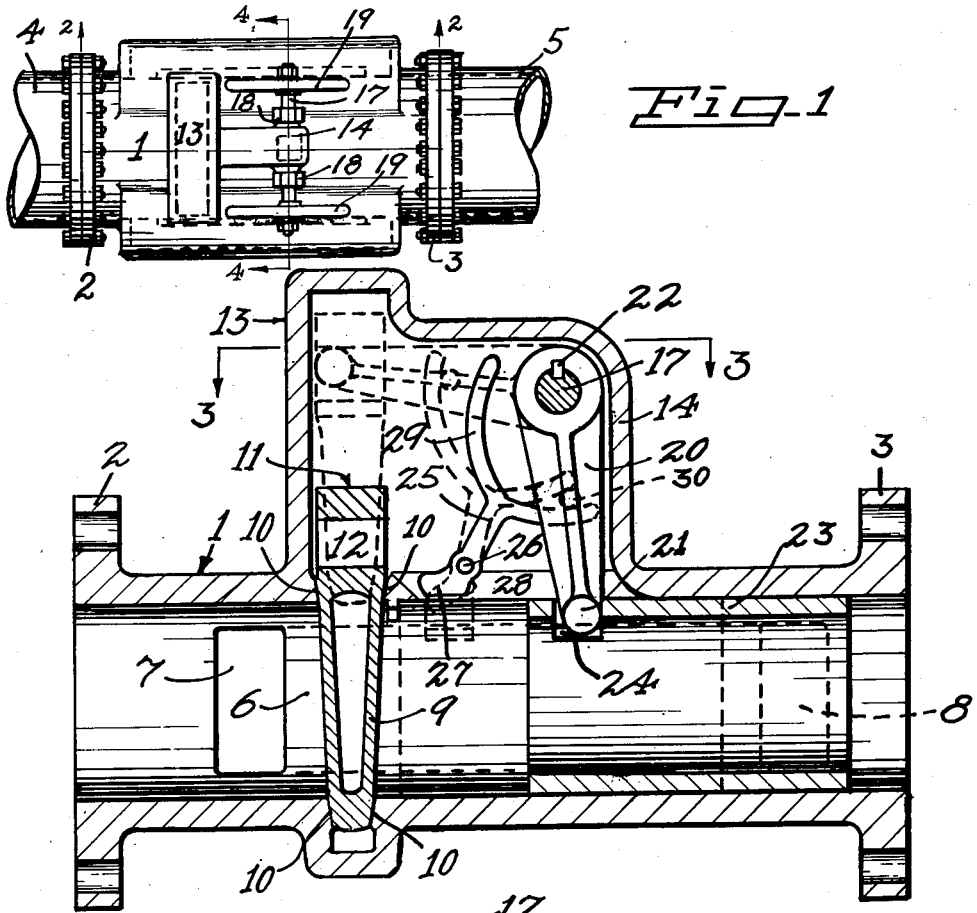
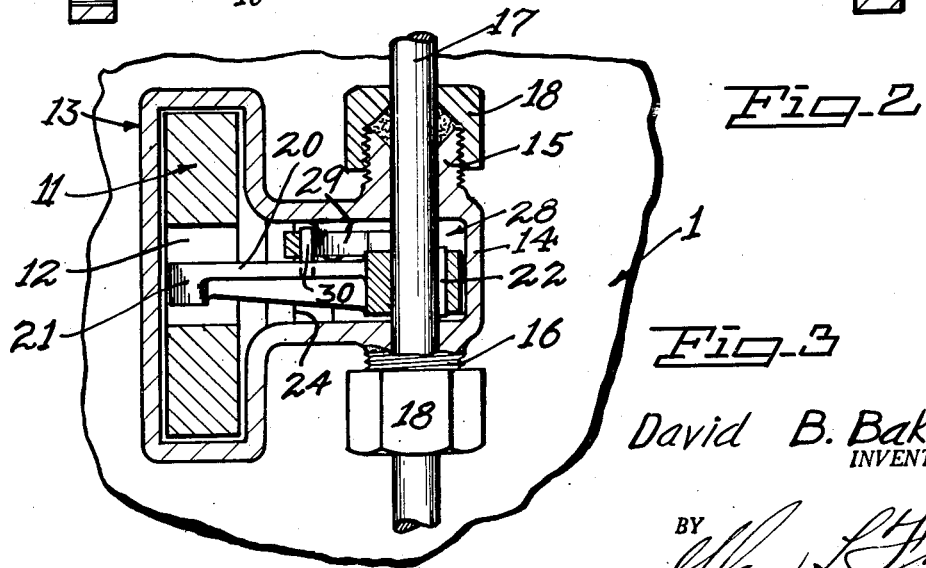
David B. Baker
INVENTOR.
BY
ATTORNEY David B. Baker
INVENTOR.

BY Glenn L. Fish
ATTORNEY

Patented Feb. 5, 1952

2,584,533

UNITED STATES PATENT OFFICE 2,584,533

PRESSURE EQUALIZING VALVE

David B. Baker, Kennewick, Wash.

Application June 14, 1948, Serial No. 32,861

6 Claims. (Cl. 277—12)

The present invention relates to the general class of gate valves for controlling fluids under pressure, and more specifically to an improved pressure equalizing valve which while well adapted for various purposes and uses is especially designed for use in pipe lines which carry fluids under high pressure. Under such conditions, the high pressure against a heavy and closed gate valve usually requires a substantial expenditure of man power, or the transmission of power from a motor, in opening and closing the gate valve. The primary purpose of my invention is the elimination of this difficulty by releasing some of the pressure against the gate valve and applying the pressure against the outlet side of the valve, thus tending to equalize the pressure at both sides of the gate valve, and thus reduce the friction between the closed valve and its seat.

For this purpose the casing of the gate valve is provided with a by-pass having ports controlled by an equalizing valve, and a single operating means is provided for both valves whereby they are successively opened and closed to control flow of the liquid or fluid under pressure through the valve casing.

The equalizing pressure valve, as a whole, includes a minimum number of parts that may with facility be manufactured at low cost of production, and the parts may be assembled with convenience to assure a reliable regulating appliance that is simple in construction and which may be manipulated with facility.

The invention consists in certain novel features of construction and combinations and arrangements of parts as will hereinafter be described, and more particularly set forth in the appended claims.

In the accompanying drawings I have illustrated a complete example of a physical embodiment of my invention wherein the parts are combined and arranged in accord with one mode I have devised for the practical application of the principles of my invention; but it will be understood that changes and alterations are contemplated and may be made in these exemplifying drawings and mechanical structures within the scope of my claims without departing from the principles of my invention.

Figure 1 is a top plan view showing the appliance of my invention interposed in a pipe line; and Figure 2 is an enlarged longitudinal vertical sectional view at line 2—2 of Fig. 1.

Figure 3 is a horizontal sectional view as at line 3—3 of Fig. 2, with the valve in its open position.

Figure 4:
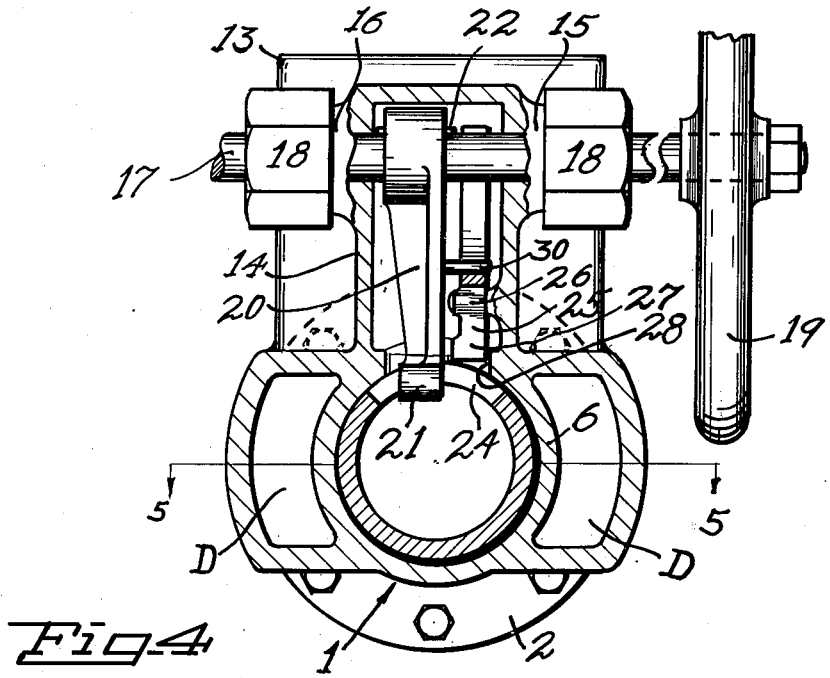
Figure 4 is a vertical transverse sectional view at line 4—4 of Fig. 1.
Figure 5:
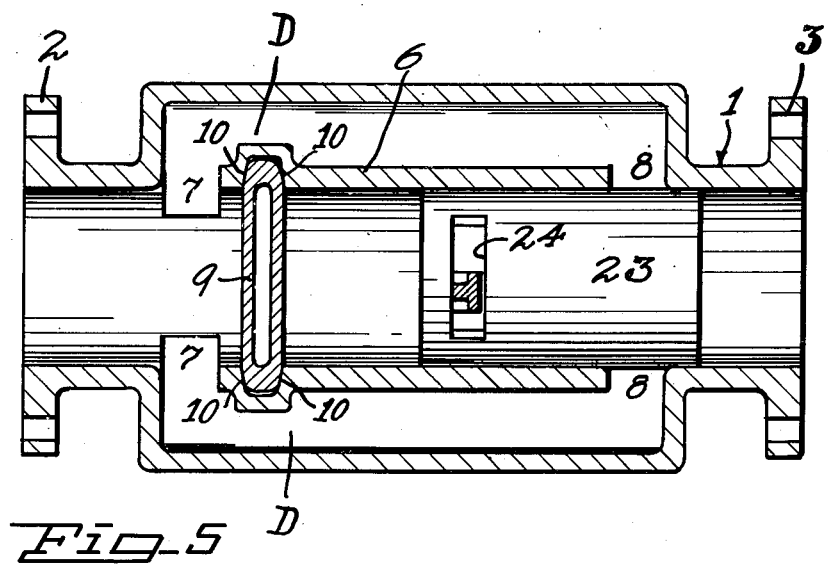
Figure 5 is a horizontal sectional view through the valve casing at line 5—5 of Fig. 4.

In the assembly view Fig. 1 the valve casing 1, which is equipped with end flanges 2 and 3, is shown as bolted at its opposite ends to the pipe sections 4 and 5, and it will be understood that water or gas, under pressure, flows from left to right through the longitudinal views of the drawings.

In carrying out my invention the integral valve casing is fashioned with an interior barrel 6 forming a fluid conveying passage having the same diameter as the inlet and outlet ends of the casing, and at its up-stream end the barrel is provided with a pair of constantly open transverse ports 7, 7, opening into a pair of longitudinally extending ducts D, D, which form a by-pass around the barrel. A second pair of transverse ports 8, 8, are provided in the down-stream end of the barrel, and these ports and ducts form a by-pass around the gate valve 9 that coacts with a seat 10 extending transversely of the barrel adjacent its intake end and at the down-stream side of the up-stream ports 7, 7.

The vertically reciprocable gate valve, which is shown as hollow and wedge-shaped, is provided with a head 11 exterior of the barrel, and this head is provided with a slot 12 that forms a socket for co-action with the valve operating means in opening and closing the valve. To accommodate the valve the casing is equipped with an upper transversely arranged housing 13, and this housing merges with a reduced extension 14 that terminates in threaded bushings 15 and 16 forming transversely arranged bearings for a rock shaft 17, and the bearings are packed and closed by nuts 18, 18. The projecting ends of the rock shaft are equipped with a pair of hand wheels 19, 19, that may be manipulated for rocking the shaft in opening and closing the reciprocable gate valve, and for this purpose the rock shaft is equipped with a rock arm 20 that forms a pivoted lever for actuating the gate valve.

The free end of the lever or arm is formed with an actuating head or lug 21, and the hub of the lever is secured on the rock shaft by means of a key as 22. The actuating head 21 is adapted to engage in the slot or socket 12 of the valve 9 for lifting the gate valve to open position as shown by dotted lines in Fig. 2, and for depressing or lowering the valve to its seat as shown by full lines.

The rocker arm or lever 20 is also adapted to engage and reciprocate an equalizing valve 23 that is slidable in the casing and barrel for controlling the outlet ports 8, 8, as seen in Fig. 2 where these ports from the ducts D, D, to the outer or rear end of the barrel are closed while the gate valve is closed. The head 21 of the lever projects into a slot or socket 24, arranged transversely of the tubular or cylindrical and open-end slide valve 23, when the gate valve is closed; and prior to the opening movement of the gate valve, the equalizing valve is shifted to the open dotted line position in Fig. 2, when the lever is actuated by turning the hand wheel or wheels. After the slide valve is opened to permit flow of fluid through the ducts or by-pass for releasing some of the pressure against the closed gate valve, by continued movement of the lever it is disengaged from the socket 24 of the slide valve and then engaged in the socket or slot 12 of the gate valve. With the fluid pressure against the closed gate valve reduced due to the equalizing flow of water or gas through the by-pass, and the equalizing pressure against the back of the gate valve, the gate valve may be lifted to open position by the final movement of the lever or rocker arm.

For detaining the initially opened equalizing valve against accidental displacement a lever 25 is pivoted at 26 in the extension 14, and provided with a head or detent 27 movable in a longitudinally extending slot 28 of the barrel, and this slot is of sufficient length to permit the necessary swinging movement of the rocker arm or lever. The actuating lever 25 is fashioned with a somewhat U-shaped yoke 29, and the rocker arm or lever 20 is equipped with a projecting pin or lug 30 in position to ride along the inner edge of the yoke for actuating the detent. By movement of the operating lever 20, the detent 27 is depressed through the slot 28 to engage the socket or slot 24, as the head 21 is disengaged therefrom, as indicated by dotted lines in Fig. 2; and by reverse movement of the operating lever the actuating lever is oscillated to lift the detent and disengage it from the equalizing valve, as the head 21 engages in the socket 24 to shift the equalizing valve to closed position, after the gate valve has been closed.

Having thus fully described my invention, what I claim as new and desire to secure by Letters Patent is:

1. In an equalizing valve device, the combination with a casing including an interior barrel forming a fluid conveying passage therethrough and a pair of longitudinally extending by-pass ducts exterior of the barrel, and said barrel having up-stream ports open to the ducts and down-stream ports open to the ducts, of a transverse gate-valve seated in the barrel at the down-stream side of the up-stream ports and operating means for reciprocating said valve, a tubular valve slidable in the barrel and casing for controlling the down-stream ports, and said slide valve having means adapted to coact with the operating means for reciprocating the slide valve.

2. In an equalizing valve device, the combination with a casing including an interior barrel forming a fluid conveying passage therethrough and a longitudinally extending by-pass duct exterior of the barrel, and said barrel having an up-stream port and a downstream port open to the duct, of a transversely arranged gate valve seated in the barrel at the down-stream side of the up-stream port, a tubular slide valve in the casing and barrel for controlling the down-stream port, valve operating means, and said valves each having means for alternate coaction with the operating means in reciprocating said valves.

3. In an equalizing valve device, the combination with a casing including an interior barrel forming a fluid conveying passage therethrough, and a longitudinally extending by-pass duct exterior of the barrel, and said barrel having an up-stream port and a down-stream port open to the duct, of a transversely arranged gate valve having a socket and seated in the barrel at the down-stream side of the up-stream port, a tubular valve having a socket and slidable in the barrel and casing to control the down-stream port, a lever pivoted in the casing, and a head on said lever for alternate coaction with said sockets in reciprocating said valves.

4. In an equalizing valve device, the combination with a casing having an interior barrel forming a fluid conveying passage therethrough and spaced up-stream and down-stream ports in said barrel, and a longitudinally extending by-pass duct exterior of the barrel and open to said ports, of a transversely arranged gate valve seated in the barrel at the down-stream side of the up-stream port, a tubular valve slidable in the casing and barrel to control the down-stream port, an operating lever pivoted in the casing and a head on the lever for alternate coaction with sockets of the valves, a detent pivotally mounted in the casing adapted to engage the slide valve while the valves are open, and coacting means on the lever and detent for releasing the detent prior to closing movement of the valves.

5. In an equalizing valve device, the combination with a casing including an interior barrel forming a fluid conveying passage having spaced up-stream and down-stream ports, and an exterior longitudinal by-pass duct open to said ports, of a transversely arranged gate valve seated in the barrel at the down-stream side of the up-stream port and operating means for opening and closing said valve, a equalizing tubular valve within the barrel and casing for controlling the down-stream port, and means on the equalizing valve for coaction with said operating means whereby both valves are successively opened and closed.

6. In an equalizing valve device, the combination with a casing including an inner barrel forming a fluid conveying passage having spaced up-stream and down-stream ports, and an outer longitudinal by-pass duct open to said ports, of a gate valve seated in the barrel at the down-stream side of the up-stream port, a tubular equalizing valve closing the down-stream port, valve operating means mounted in the casing, and means on each valve for alternate coaction with the operating means, whereby both valves are successively opened and closed.

DAVID B. BAKER.

REFERENCES CITED

The following references are of record in the file of this patent:

UNITED STATES PATENTS

| Number | Name | Date |
| --- | --- | --- |
| 1,222,397 | Hamilton | Apr. 10, 1917 |
| 1,493,819 | Marscheider | May 13, 1924 |
| 1,905,625 | Fagan | Apr. 25, 1933 |
| 1,922,225 | Wickersham | Apr. 15, 1933 |